Figure 1:
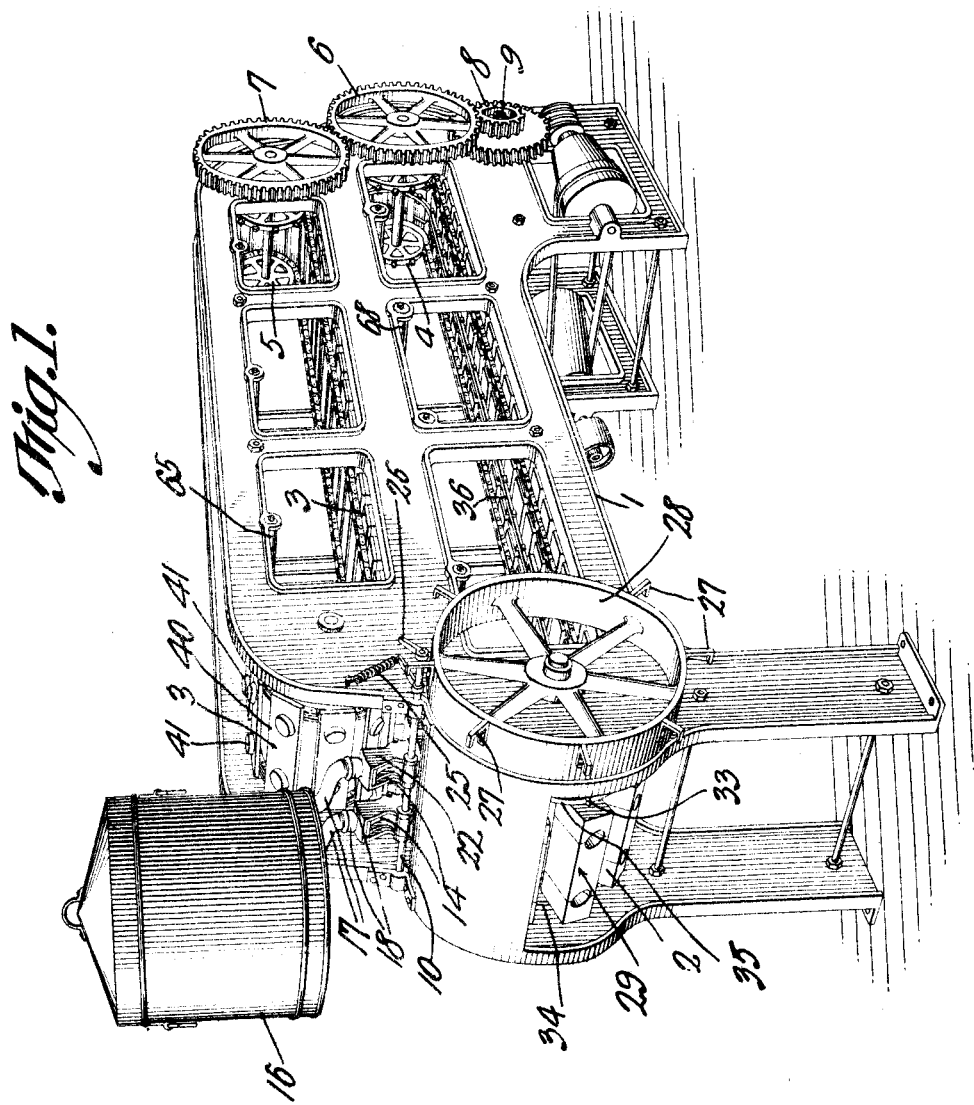

J. H. CARPENTER.
BAKING MACHINE.
APPLICATION FILED FEB. 26, 1914.

1,128,407.

Patented Feb. 16, 1915.
4 SHEETS—SHEET 1.

Witnesses

John H. Carpenter Inventor
by C. A. Snow & Co.
Attorneys

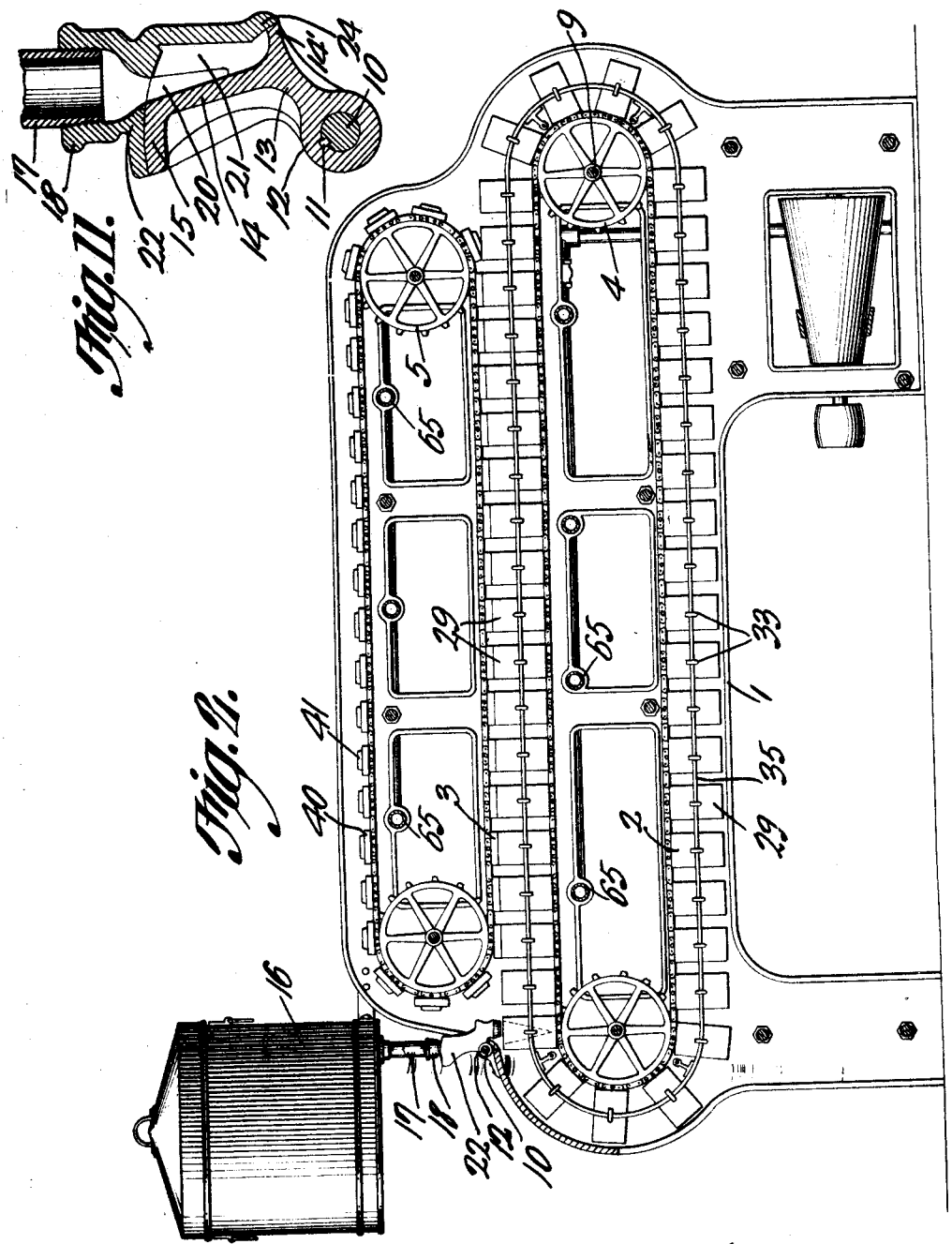

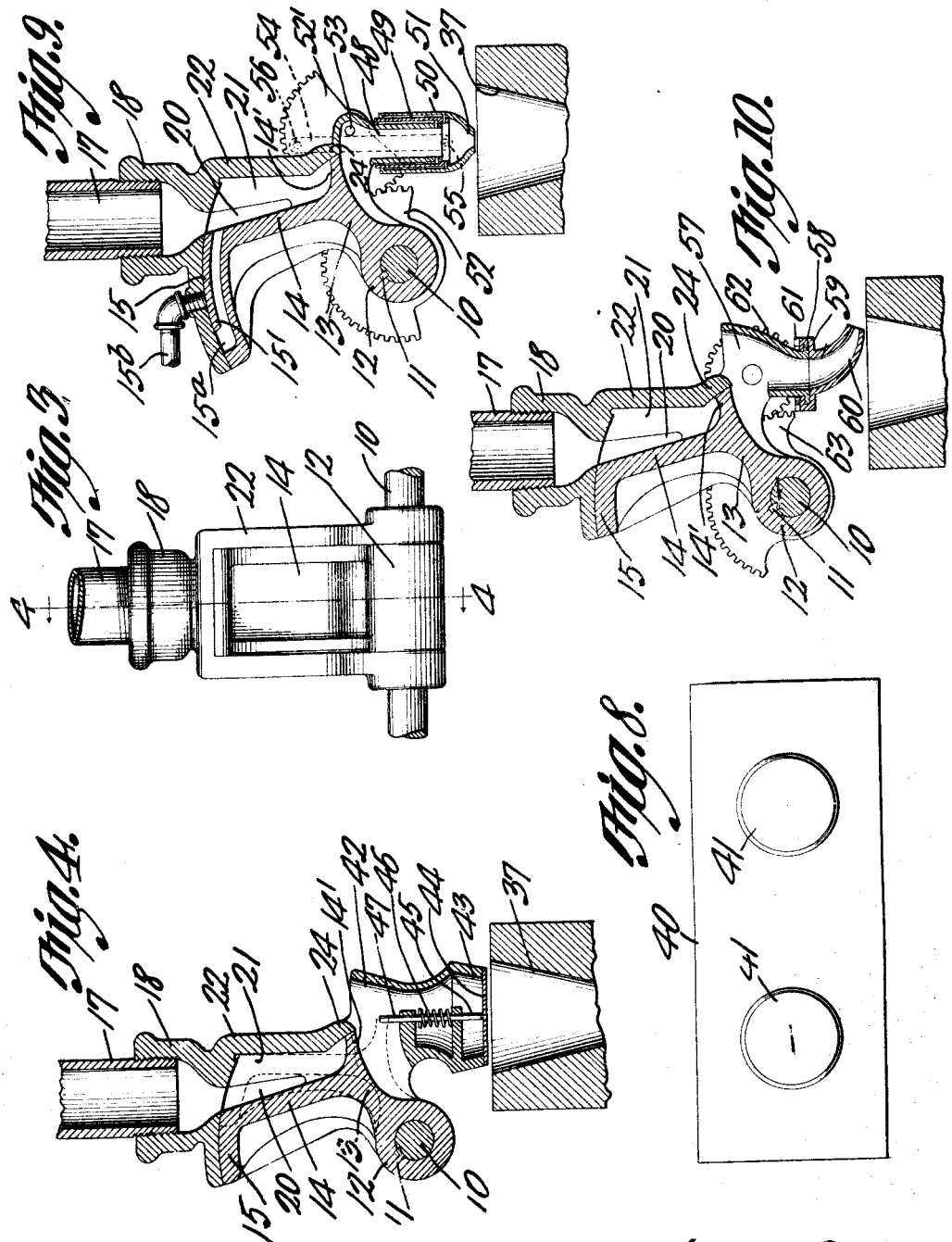

J. H. CARPENTER.
BAKING MACHINE.
APPLICATION FILED FEB. 26, 1914.
1,128,407.
Patented Feb. 16, 1915.
4 SHEETS—SHEET 4.
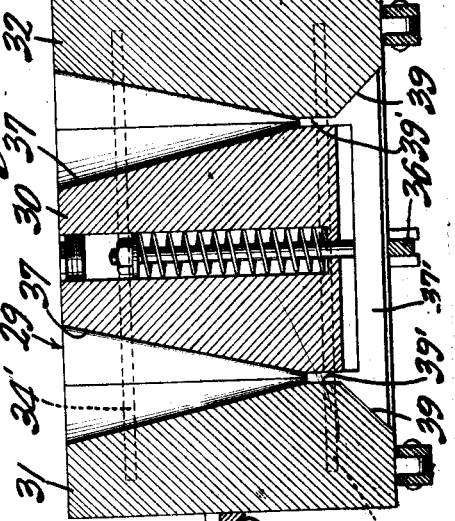
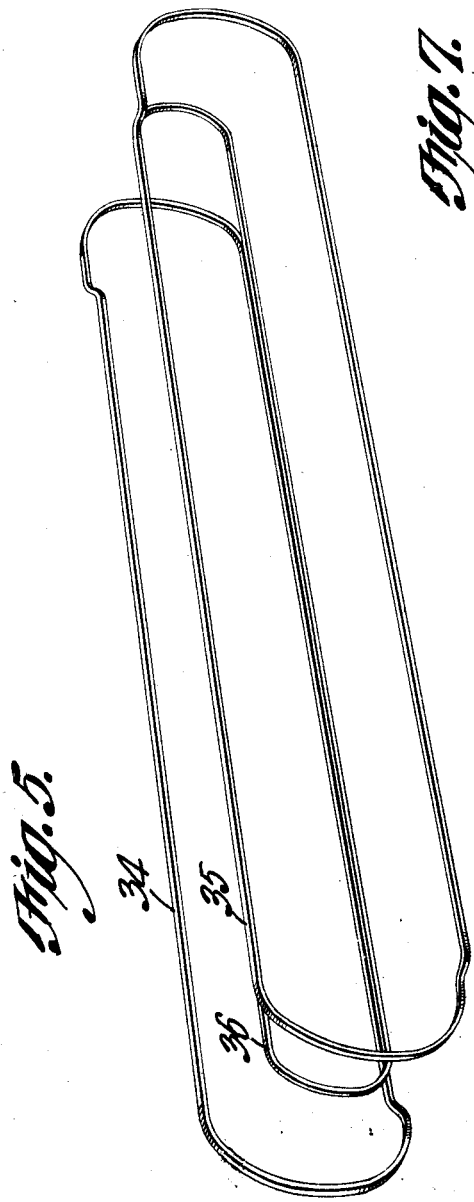
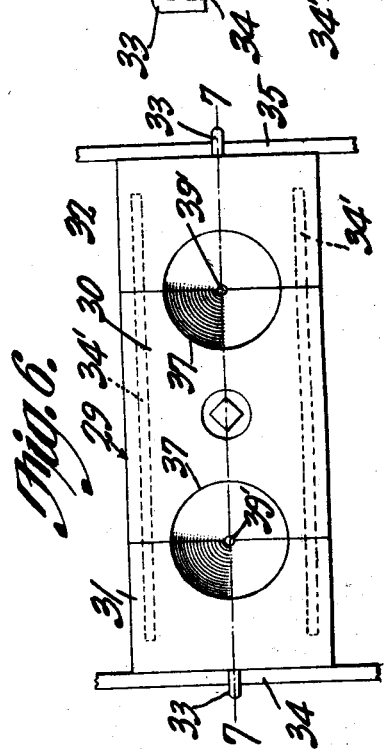
John H. Carpenter, Inventor
by C. A. Snow & Co.
Attorneys
Witnesses

UNITED STATES PATENT OFFICE.

JOHN H. CARPENTER, OF COLUMBUS, OHIO.

BAKING-MACHINE.

1,128,407.　　　　　　Specification of Letters Patent.　　Patented Feb. 16, 1915.

Application filed February 26, 1914. Serial No. 821,261.

*To all whom it may concern:*

Be it known that I, JOHN H. CARPENTER, a citizen of the United States, residing at Columbus, in the county of Franklin and State of Ohio, have invented a new and useful Baking-Machine, of which the following is a specification.

The present invention relates to improvements in baking machines, and more particularly to that type of machine shown in U. S. Letters Patent No. 1,014,375 dated January 9, 1912 and granted to J. H. Carpenter and E. O. Hoffman, one object of the present invention being the provision of a batter ejecting or pumping mechanism disposed to operate in consonance with the moving baking plate so that the batter will be ejected thereupon without undue splashing and in the desired quantity to insure the proper spreading of the batter upon the plates and at the same time produce the desired thickness of material to be formed into cones or in fact any other shape.

A further object of the present invention is the provision of a batter ejecting or pumping mechanism in which a reciprocating or oscillatory member is provided and acts as a propulsion member, a cut-off member both for the supply of the batter to the same and for the outlet end of the device, the same acting to measure the batter to secure the desired quantity.

A still further object of the present invention, is the provision of baking plates, in which various shaped articles may be baked, that is a complete ice cream cone, the female die of the same being a separable die and having the sections thereof moved to and from each other during the traveling of the carrying element so that the batter is received at the proper time from the pump, and is spread by the ejecting action from the pump so that the surface of the female receptacle will be properly coated therewith, the completed or baked article being ejected during the separation of the sections at the outlet end of the machine so that a complete cone will be baked in transit.

A still further object of the present invention is the provision of a sealing member disposed to coöperate in conjunction with the female member and carried by the upper element so that the rim of the cone will be properly shaped and at the same time the heat be retained for properly rolling and baking the interior surface of the cone during the traveling of the various elements.

With the foregoing and other objects in view which will appear as the description proceeds, the invention resides in the combination and arrangement of parts and in the details of construction hereinafter described and claimed, it being understood that changes in the precise embodiment of the invention herein desclosed can be made within the scope of what is claimed without departing from the spirit of the invention.

In the drawings Figure 1 is a perspective view taken from the pumping end of a complete baking machine made according to and embodying the present invention. Fig. 2 is a longitudinal sectional view therethrough. Fig. 3 is a front elevation of one of the batter ejecting pumps. Fig. 4 is a section taken on line 4—4 of Fig. 3. Fig. 5 is a diagrammatic view of the guides used for separating the sections of the female baking member. Fig. 6 is a top plan view of one of the female dies of the baking member. Fig. 7 is a section taken on line 7—7 of Fig. 6. Fig. 8 is a detail plan view of the male member of the baking element. Figs. 9 and 10 are views similar to Fig. 4 of several modifications. Fig. 11 is a view similar to Fig. 4 of a pump to be used with the flat form of baking plates illustrated in the before mentioned patent.

Referring to the drawings, the numeral 1 designates the supporting frame or structure, which has mounted therein as illustrated in the before mentioned patent, the lower set or baking element 2 and the upper set or baking element 3. Mounted at one end is a driving spider 4 for the baking element 2 and a driving spider 5 for the baking element 3. The gears 6 and 7 are connected to the various spiders and are geared for simultaneous operation, the gear 6 being operated by the driving gear 8 mounted upon the driving shaft 9 which is operated by an electric or other motor (not shown).

In order that the batter may be introduced at the proper time between the respective baking elements and upon the floating plates, as shown in the patent referred to, of the lower element, a shaft 10 is mounted at the inlet end of the machine for oscillation and has keyed thereupon by means of the key 11, the sleeve 12 of the plunger 14, said plunger 14 being connected to the sleeve by means of the arm 13 and carrying the lip 14' which constitutes as will presently appear a cut-off and batter directing means. A segmental plate 15 is formed integral with the pump or plunger 14 and also acts as a cut-off as will presently appear. The batter container 16 is mounted suitably upon the super-structure of the machine and has led therefrom in the present instance, two directing conduits 17, there being a battery of two pumps used with this particular machine. The lower end of each pipe 17 is led into the cup-shaped member 18 of the stationary member 22 of the pump, the chamber 19 being in communication with the chamber 21 of the member 22 and as the opposite walls of the chamber 21 are grooved or slotted as at 20, the batter is permitted to enter into the chamber 21 both from the top and at both sides thereof so that when the pump is in the position as shown in Fig. 4, said chamber 21 will be filled up to the top, so that when the plunger 14 is moved to assume the dotted line position, the segmental plate 15 will act as a cut-off for the outlet 19 and thus the batter contained within the chamber 21 will be ejected by pressure beyond and through the outlet formed by the lips 14' and 24, the outlet 14' moving to the dotted line position and thereby directing the batter upon the plate 28 therebelow without undue splashing of the batter thereupon.

In order to operate the shaft 10 so that the same will be properly oscillated to actuate the plunger 14, a spring 25 is connected to return the shaft to cause the plunger 14 to assume the full line position in Fig. 4, while an arm 26 is carried by the shaft 10 and disposed in the path to be engaged by the respective pins 27, secured to the periphery of the wheel 28, so that at the presentation of each baking plate, the shaft 10 will be oscillated and consequently the plunger 14 will be moved in timed relation so that the batter when ejected from its respective pump will be delivered upon or into the plate to receive the same.

When the present device is used in connection with forming various shaped articles, as for instance, the complete cone, and thus dispensing with the manual shaping of the same after being delivered by the respective baking plates, each plate 29 carried by the lower element 2, is composed of three sections 30, 31 and 32, the section 30 being the central and stationary section, while the sections 31 and 32 are the movable section and are each provided with a lug 33 for engagement with the respective tracks 34 and 35 mounted in the frame and in coactive relation therewith so that such sections may be moved to and from the central section during the movement of the female baking element longitudinally of the machine.

The central section 30 of the female member is provided with the guiding rods 34' upon which the outer members slide, so that the same will be held in the same relative position at all times, while the central guide 36 maintains the central section in proper relation at all times during its movement in the machine. Carried by the central member adjacent each matrix 37 thereof, is a cone ejector 37', controlled by the spring 38 and the wedge shaped edge 39 so that when the same is released due to the separation of the sections at the end of the machine, the pins 39' will engage the apex of the article being baked and thus eject the same from the mold, the movement of the outer sections toward the central section causing the ejector to assume its normal position at the lower end of the mold socket.

The male member or baking plate 40 carried by the upper set 3, is provided with a single truncated member 41 for each female mold socket and coöperates therewith to assist in sealing the mold socket thereof and at the same time forming a rim upon the article being baked, so that no rough edges are permitted. This member leaves the female member at the outlet end of the machine just previous to the separation of the sections of the female member and to a certain extent assists in loosening the baked article from the mold so that the same is easily ejected.

It will be noted that the guide for actuating the movable sections of the female mold, are so disposed within the super-structure and in relation to the spiders and other mechanism, that such sections are held closely together during the receiving of the batter at the pump end thereof and during the complete baking thereof, the same being opened at the exit end and during the lower travel when the molds are inverted, this assisting to some extent in cooling the mold so that when receiving the batter there will be no danger of the same burning and forming a crust upon the mold. Any form of mechanism may be employed to receive the cones as they are ejected from the molds to be carried away from the machine as may be found expedient. Where this form of mold is employed, it is necessary that the batter from the respective pumps be distributed therein while the mold is moving, although it is evident that an intermittent action may be imparted to the baking element so that the mold 37 will be halted momentarily at the outlet of its pump.

One form of distributer is shown in Fig. 4, wherein the receptacle 42 receives the batter emptied from the chamber 21 and such batter is distributed through the outlet nozzle 43 which coacting with the disk sprayer or valve 44 directs the batter in a circumferential stream against the side walls of the mold 37 so that such walls are coated. The stem 45 of the valve is guided so that its end 47 is disposed in the path to be depressed by the lip 14' against the action of the spring 46, which automatically returns the valve 44 to closed position to prevent any dripping of the batter from the nozzle.

In the form of nozzle shown in Fig. 9, the same is so constructed as to be projected within the mold 37 to properly distribute the batter therein, air being admitted after such distribution so as to force the batter upwardly and in a film upon the side walls of the heated mold. In this instance, the directing member 48 is cylindrical and has the telescopic members 49 and 50 mounted telescopically thereupon, the reduced end 51 of the member 50 being the nozzle member for projection within the mold 37. In order to impart the downward and upward movement to the telescopic members, a segmental gear 52 is connected to the shaft 10 and meshes with the segmental gear 52' journaled at 53 to the tubular member 48, there being connected a link 54 and pins 55 and 56 to the gear 52 and nozzle 50, so that such nozzle section 50 is projected downwardly and elevated after the proper introduction of the batter within the mold 37. A plate 15' in this instance is provided with the air directing channel 15ᵃ which is disposed to be placed in registration with the air directing pipe 15ᵇ when the plunger 14 has moved sufficiently far to the right to close communication from the pipe 17. Thus the air pressure assists in distributing the batter from the chamber 21 and at the same time assists in forcing the same through the nozzle 51 and to form a film upon the sides of the mold 37.

In the form of pump shown in Fig. 10, the distributing member 57 is provided with the flange 58 upon which is rotatably mounted the coupling 59 of the curved nozzle 60. A gear 61 is provided and through the gear 62 and the operating gear 63, such nozzle 60 is rotated when within the mold 37 so as to insure the direction of the batter upon the sides of the mold.

In these forms it is evident that the oscillation of the shaft 10 controls the operation of all of the nozzles and as before stated, the batter may be delivered into the molds 37 when they are moving or when they are intermittently stopped to receive the batter. In order to properly heat the mold, the heating jets 65 are employed and disposed wherever found necessary. When desired a single pump and a single mold may be employed, at which time both sections will be made to move and be held together relatively to each other so as to be always properly alined when moving to and from each other, such mold being approximately one-half of the double mold illustrated.

What is claimed is:

1. The combination in a baking machine, of coöperable traveling baking elements, a batter container, a pump including two jaws, one of which is movable for ejecting a predetermined quantity of batter between the elements, and coöperable means carried by the baking elements and ejecting member of the pump for actuating the same in consonance with the baking element.

2. The combination with two coöperable traveling baking elements, of means for supplying batter thereto, including a container, a rock shaft, coöperable means carried by the rock shaft and by the baking elements for operating the rock shaft, and a pump, including a stationary jaw for receiving the batter and a movable jaw disposed in coöperable relation thereto and connected to the shaft, whereby when the shaft is rocked, the movable jaw is moved toward the stationary jaw to eject a predetermined quantity of batter.

3. The combination with two coöperable traveling baking elements, of means for supplying batter thereto, including a container, a rock shaft, coöperable means carried by the rock shaft and by the baking elements for operating the rock shaft, and a pump, including a stationary jaw for receiving the batter and a movable jaw disposed in coöperable relation thereto and connected to the shaft, whereby when the shaft is rocked, the movable jaw is moved toward the stationary jaw to eject a predetermined quantity of batter, the stationary and movable jaws of the pump being provided with coacting guiding lips for directing the batter in gradually increasing streams during the movement of the movable jaw.

4. In a baking machine, the combination with two coöperable traveling baking elements, of a batter feeding mechanism including a rock shaft mounted at one end of the machine, a batter container, a spout led therefrom, a batter receiving and ejecting pump, including a stationary vertically disposed jaw provided with a chamber in communication with the spout, and a movable jaw connected to the rock shaft for coaction with the stationary jaw to squeeze the batter therefrom and simultaneously close the spout when moved in one direction, and to open the spout when moved in the opposite direction.

5. In a baking machine, the combination with two coöperable traveling baking elements, of a batter feeding mechanism including a rock shaft mounted at one end of the machine, a batter container, a spout led therefrom, a batter receiving and ejecting pump, including a stationary vertically disposed jaw provided with a chamber in communication with the spout, a movable jaw connected to the rock shaft, coöperable cut-off mechanisms carried by the two jaws for regulating the flow of batter into the chamber of the stationary jaw, coöperable lip forming means carried by both jaws and constituting the outlet for the pump, and coöperable means carried by the rock shaft and one of the baking elements for rocking the shaft and the movable jaw in timed relation to the baking elements.

6. In a baking machine, the combination with two coöperable traveling baking elements, one of which constitutes the male and the other the female mold thereof, the female mold being composed of a plurality of sections, means disposed in the path of the sections for moving the same to and from each other during the movement of the baking elements, a batter supplying means disposed in coöperation with the female mold for injecting the batter thereinto to coat the walls thereof, and an ejector for the female mold carried thereby and operated during the separation of the sections.

7. In a baking machine, the combination with two coöperable traveling baking elements, one of which constitutes the male and the other the female mold thereof, the female mold being composed of two sections, means disposed in the path of the sections for moving them to and from each other during the movement of the baking elements, coöperative means carried by the sections to insure parallelism between the sections a batter supplying means disposed in coöperation with the female mold for injecting the batter thereinto to coat the walls thereof, and a closure for the female mold carried by the male member to seal and slightly project into the article being baked and to form a rim thereupon during the baking operation.

8. In a baking machine, the combination with two coöperable traveling baking elements, one of which constitutes the male and the other the female mold thereof, the female mold being composed of a plurality of sections, means disposed in the path of the sections for moving the same to and from each other during the movement of the baking elements, a batter supplying means disposed in coöperation with the female mold for injecting the batter thereinto to coat the walls thereof, a closure for the female mold carried by the male member to seal the article being baked and to form a rim thereupon during the baking operation, and an ejector for the female mold carried thereby and operated during the separation of the sections.

9. In a baking machine, the combination with two coöperable baking elements, of means for supplying batter thereto, including a batter container, a vertically disposed jaw having two parallel walls and a curved top, said top being provided with a port in communication with the container, a movable jaw disposed for movement within the walls and top of the stationary jaw and forming a cut off for the port, and means for directing the batter from the stationary jaw to the baking elements.

10. In a baking machine, the combination with two coöperable baking elements, of means for supplying batter thereto, including a batter container, a vertically disposed jaw having two parallel walls and a curved top, said top being provided with a port in communication with the container, a movable jaw disposed for movement within the walls and top of the stationary jaw and forming a cut off for the port, said movable jaw having a closure for the lower end of the stationary jaw, said closure being open when the port is closed and vice versa, and means for directing the batter to the baking elements.

11. In a baking machine, the combination with two coöperable baking elements, of a batter supplying device, including a container, a vertically disposed stationary jaw having two side walls and a top, said top being provided with a port communicating with the container, a rock shaft, and a movable jaw operably connected to the rock shaft for movement between the walls and top, said movable jaw being provided with a port cut off at its upper end and a lip at its lower end, said lip coöperating with the lower end of the stationary jaw to form the bottom of the receptacle formed by the two jaws, when the port is opened, and to form a batter directing spout as the movable jaw is moved toward the stationary jaw to close the port and eject the batter upon the baking elements.

In testimony that I claim the foregoing as my own, I have hereto affixed my signature in the presence of two witnesses.

JOHN H. CARPENTER

Witnesses:
THEODORE WEYANT,
R. C. W. HASTINGS.